United States Patent [19]
Geist et al.

[11] 3,864,086
[45] Feb. 4, 1975

[54] APPARATUS FOR MEASURING GASEOUS QUALITY OF A SUBSTANCE

[75] Inventors: Kenneth R. Geist; James E. Walsh, both of Milwaukee, Wis.

[73] Assignee: Brust, by said Geist, a part interest

[22] Filed: Dec. 29, 1971

[21] Appl. No.: 213,523

[52] U.S. Cl................ 23/253 R, 23/254 R, 73/401
[51] Int. Cl. ............................................ G01n 7/18
[58] Field of Search .......... 23/230 R, 253 R, 254 R, 23/259; 195/103.5 R; 73/19, 401

[56]                References Cited
              UNITED STATES PATENTS

| | | | |
|---|---|---|---|
| 99,976 | 2/1870 | Twitchell | 23/230 R |
| 362,402 | 5/1887 | Stearns | 23/230 R |
| 383,433 | 5/1888 | Bonte | 23/253 R |
| 1,782,644 | 11/1930 | Brenneman | 73/401 X |
| 1,874,339 | 8/1932 | Norton | 23/253 R X |
| 2,773,747 | 12/1956 | King et al. | 23/253 R |
| 2,894,393 | 7/1959 | Koelle | 73/401 |

OTHER PUBLICATIONS

Methods of Analysis of the Assoc. Offic. Agr. Chem., 5th ed., (1940), pp. 186-187.

Primary Examiner—Morris O. Wolk
Assistant Examiner—Timothy W. Hagan

[57] ABSTRACT

Apparatus for measuring the gaseous quality of a substance to draw a conclusion thereabout, i.e., the acidity of a liquid sample by means of a reagent, comprises a sealable flask for receiving the sample and the reagent. The flask is sealed by a removable stopper having two openings therein. One opening accommodates a syringe whereby the sample is injected into the flask.

A tube has one end connected to the other opening in the stopper to receive gas generated when the sample and the reagent are mixed. The other end of the tube is exposed to atmosphere. The tube has a flexible U-shaped portion filled with a colored indicator liquid and is adjustable so that the meniscus of the indicator liquid in one leg of the U-shaped portion can be aligned with a starting point on an acidity scale prior to mixing of the sample and the reagent.

5 Claims, 3 Drawing Figures

APPARATUS FOR MEASURING GASEOUS QUALITY OF A SUBSTANCE

BACKGROUND OF THE INVENTION

1. Field of Use

This invention relates generally to apparatus and a method for measuring the gaseous quality of a sample substance.

2. Description of the Prior Art

For test purposes it is sometimes desirable to expose a sample of some substance to the action of an agent of some kind and to measure the quantity of gas evolved or absorbed by the sample in order to draw a conclusion about the nature of the substance. The substance may be a liquid, or solid, inorganic or organic, and the agent may be a liquid or solid or even heat or light.

In the art and science of fermenting wine, for example, it is necessary at various stages in the fermentation process to test or measure the acid content of the wine to determine if it is within a desired range and to undertake various corrective measures in the fermentation process if it is not. In commercial wineries, it is the practice to withdraw a sample of wine from the fermentation casks and to subject it to tests using laboratory facilities, instruments and chemical reagents. However, making wine at home has become an increasingly popular and widespread activity and, while alcoholic content testing must be carried out to insure a quality product, elaborate testing facilities and special chemicals are unavailable to or too costly for the average home winemaker. It is desirable, therefore, to provide simple method for testing the acidity of wine or other alcoholic or non-alcoholic beverages which is readily available to home winemakers or others, economical, and easy to use. U.S. Pat. No. 383,433 to Bonte issued May 29, 1888 discloses an early attempt to provide an acidity tester which employed a specially constructed, complicated graduated flask and a reagent for making the test. However, that apparatus does not lend itself to economical fabrication and it is also apparently quite fragile and complicated to use. It is desirable, therefore, to provide improved apparatus and methods for acidity testing.

SUMMARY OF THE PRESENT INVENTION

Apparatus in accordance with the present invention for measuring the gaseous quality of a substance in the presence of an agent, i.e., for testing the acidity of a liquid by means of a reagent, comprises a sealable flask for receiving a sample of the substance and wherein it is exposed to the action of an agent, a scale indicative of the volume of gas evolved or absorbed by the substance, and tube means having one end connected to the flask to receive gas generated when the sample is exposed to the agent and having its other end exposed to atmosphere. The tube means has a U-shaped portion filled with an indicator liquid, preferably colored, and is adjustable so that the meniscus of the indicator liquid in one leg of the U-shaped portion can be aligned initially with a predetermined starting point on the scale prior to exposure of the sample to the agent.

In a preferred embodiment, the opening of the sealable flask through which the agent is supplied in the form of a liquid or solid reagent is sealed by a removable stopper having two openings therein. One end of the tube means is connected to one opening in the stopper. A syringe into which a sample of liquid substance of predetermined volume is drawn is insertable into the other opening in the stopper and seals that opening prior to injection of the sample into the flask and prior to adjustment of the meniscus with respect to the scale. The scale is provided on a scale member which is removable from a supporting stand on which the components of the apparatus are mounted.

DRAWINGS

DESCRIPTION OF A PREFERRED EMBODIMENT

Apparatus

Figure 3:
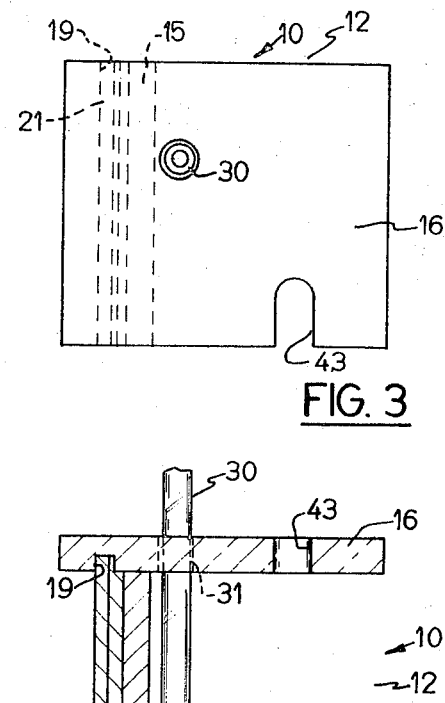
FIG. 3 is a top plan view of the apparatus shown in FIGS. 1 and 2.
Figures 1, 2:
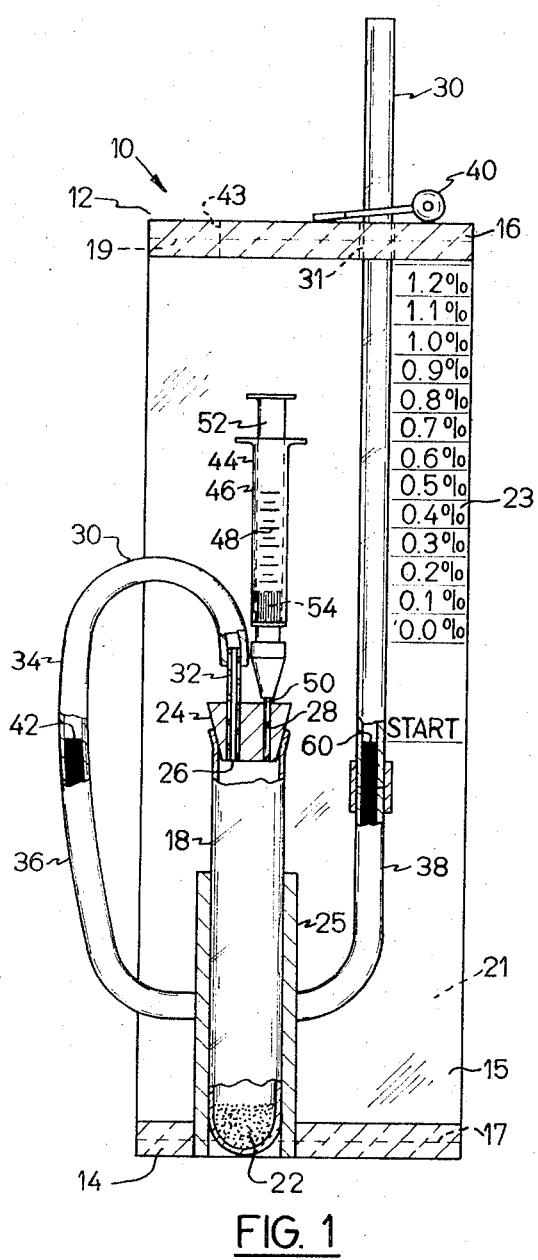
FIG. 1 is a front view, partly in cross section, of apparatus in accordance with the invention.
FIG. 2 is a side view, partly in cross section of the apparatus shown in FIG. 1.

Referring to FIGS. 1, 2 and 3, the numeral 10 designates an acidity testing and measuring apparatus or device in accordance with the present invention. Device 10 comprises a supporting stand 12 including a base portion 14, an upright portion 15 and a top portion 16. Preferably, stand 12 is fabricated of transparent plastic. Base 14 and top portion 16 are provided with grooves 17 and 19, respectively, which accommodate a rectangularly shaped removable scale member 21 which has a scale 23, hereinafter described, thereon which is visible through upright portion 15 of supporting stand 12. Scale member 21 is removable from stand 12 and similar scale members with other calibrations can be substituted therefor.

A sealable flask 18, in the form of a test tube, is rigidly (but removably) mounted in a hollow cylindrical member 25 secured to base portion 14 of stand 12. Flask 18 is adapted to receive and contain a reagent 22 which takes form, for example, of sodium bicarbonate and a measured sample of liquid to be tested and measured for acid content, as hereinafter explained.

The mouth of flask 18 is adapted to be sealed by a removable stopper 24, preferably made of rubber or the like, which has two openings 26 and 28 therethrough. Opening 26 of stopper 24 is adapted to be connected to one end of a hollow tube means 30 into which gas generated when the sample and reagent are mixed is conducted. For convenience, tube means 30 comprises a rigid section 32, preferably glass or plastic, which fits tightly into opening 26 in stopper 24, and a flexible section 34 which is connected at one end to rigid section 32. The flexible section 34 of tube means 30 is arranged to provide a U-shaped portion having two generally upright (i.e., non-horizontal) legs 36 and 38 and leg 38 is detachably supported on stand 12 by means, for example, of a hole 31 in top portion 16 in stand 12 and a metal spring clip 40, such as Mohr clamp, which is secured to tube means 30 just above top portion 16 of support stand 12. The U-shaped section of tube means 30 is filled with an indicator liquid 42, preferably water which is colored to enhance its visibility. The other end of tube means 30 is open and exposed to atmosphere.

Top portion 16 in stand 12 is provided with a slot 43 at one edge thereof for accommodating tube means 30 when stopper 24 (with tube means 30 attached) is removed from flask 18 and needs to be supported while preliminary preparations are carried out.

Opening 28 of stopper 24 is adapted to accommodate and to be sealed off by means, such as a syringe 44, by which a measured sample of liquid to be tested is supplied to flask 18. Syringe 44 comprises a hollow body 46 having measuring indicia 48 thereon, a hollow stem 50 connected thereto which fits tightly in opening 28 in stopper 24, and a movable piston or plunger 52 by which a measured sample 54 of liquid to be tested is drawn into the syringe and discharged into flask 18. Preferably, the indicia 48 on syringe 44 indicate milliliters and a preferred sample size would be one milliliter.

Referring again to tube means 30, the aforesaid other end of flexible section 34 thereof, i.e., leg 38 of the U-shaped portion, is disposed alongside scale 23. If pereferred, scale 23 could take the form of a decal or be inscribed directly in or on scale mamber 21. Scale 23 is calibrated, for example, to provide a direct reading of the percentage (by weight) of acidity.

Scale 23 comprises indicia which commences with a start point at the lower end thereof and contains numbers up to 1.2 percent arranged vertically upward in ascending numerical order. A meniscus 60 of indicator liquid 42 in leg 38 adjacent a calibration point on scale 23 provides a direct readout of percentage of weight of acid in the sample.

METHOD

The method of testing a liquid to determine or measure the acid content or acidity level thereof in accordance with the invention and by means of device 10 and reagent 22 comprises the following steps.

With syringe 44 removed from opening 28 in stopper 24 and with the latter removed from flask 18 (tube means 30 then being supportable in slot 43), an excess amount of reagent 22 is added to the flask. Stopper 24 is then replaced in the mouth of flask 18.

Syringe 44 is then used to draw a measured sample 54 (of predetermined volume) of liquid to be tested and the stem 50 of the syringe is inserted into opening 28 in stopper 24. At this point, the system is sealed i.e., the air spaces in flask 18 and in leg 36 of tube means 30 no longer communicate with atmosphere.

At this stage, clip 40 is detached from leg 38 of tube means 30 and leg 31 is moved vertically (either upwardly or downwardly) until meniscus 60 is level with the start point on scale 23. This movement is possible because section 34 of tube means 30 is flexible. This movement is necessary, for example, because the volume of air trapped in the sealed system may vary depending on the amount of reagent used, the size of the sample and the extent of insertion of stopper 24 in flask 18. When the start point is found, clip 40 is reattached to leg 38.

After this, plunger 52 of syringe 44 is depressed to inject sample 54 into flask 18 wherein it mixes with reagent 22 to effect a chemical reaction which causes a gas to be generated or evolved. The volume of gas generated is a function of the percent by weight of acid in the measured sample 54 and the pressure of the gas causes indicator liquid 42 in tube means 34 to be displaced by an equivalent amount. Accordingly, meniscus 60 of indicator liquid 42 rises above the start point on scale 23 for a distance equivalent to the amount of gas evolved and comes to rest opposite a point on the scale indicative of the percent by weight of acid in the sample being tested. This point is read and gives a direct indication or readout of the percentage of acid in the test sample.

At this point the test is complete and the apparatus may be easily disassembled and cleansed.

It is apparent from the foregoing that device 10 is simple and economical to fabricate, that it is easy to use and insures correct sample and reagent measurement. Furthermore, the test results are definite, highly visible and provide direct information without the need for conversion tables. Also, the device is rugged and easily disassembled for cleaning or for commercial packaging and shipment.

It is also to be noted that scale member 21 may be replaced with another scale member which is provided with a scale which provides a readout of some other characteristic of a sample being tested which is related to gas evolution or absorption when the sample substance is exposed to an agent.

We claim:

1. Apparatus for directly measuring the percentage by weight of acid contained in a liquid sample of predetermined volume comprising: a supporting means, a sealable flask removably mounted in a fixed position on said supporting means and wherein said sample and an agent are to be mixed to effect evolution of a gas, said flask having a mouth through which said agent is deposited prior to sealing of said flask, removable sealing means for insertion into said mouth to seal said flask, said sealing means having a first opening and a second opening, sample supplying means selectively operable to inject said sample into said flask after said flask is sealed, said sample supplying means being closed to prevent gas escape therethrough and being removably insertable into said first opening in said removable sealing means in sealed relationship, said flask having an air space therein which tends to vary in volume depending on the amount of agent deposited in said flask or the extent of insertion of said sealing means in said mouth or both, tube means having one end connected to said second opening in said sealing means and having its other end exposed to atmosphere, said tube means comprising a flexible intermediate portion and a vertically movable upright leg portion at its said other end, said upright leg portion having a transparent portion, an indicator liquid in said tube means providing a meniscus in said movable upright leg portion which is visible through said transparent portion, scale means mounted in fixed position on said supporting means and including a fixed starting point and fixed graduated indicia directly indicative of percentages by weight of acid possibly contained in a sample, and attachment means for releasably securing said movable upright leg to said supporting means in desired fixed adjustment positions, said movable leg portion being relatively movable vertically with respect to said scale means to initially effect alignment of said meniscus with said starting point after said flask is sealed and prior to exposure of said sample to said agent for adjustment purposes to compensate for variations in volume in the air space in said flask, said indicator liquid being subsequently displaceable in response to generation of gas in said sealed flask so that said meniscus moves into alignment with the said indicia on said scale means to provide a direct indication of the percentage by weight of acid present in said sample.

2. Apparatus according to claim 1 including second attachment means on said supporting means for holding said sealing means when the latter are removed from said flask.

3. Apparatus according to claim 1 wherein said means for providing said sample to said flask comprises a syringe for holding a predetermined quantity of liquid.

4. Apparatus according to claim 1 wherein said indicator liquid is colored.

5. Apparatus for directly measuring the percentage by weight of acid contained in a liquid sample of predetermined volume comprising: a supporting means including a base and an upright member, a sealable flask removably mounted in a fixed position on the base of said supporting means and wherein said sample and an agent are to be mixed to effect evolution of a gas, said flask having a mouth through which said agent is deposited prior to sealing of said flask, removable flexible sealing means for insertion into said mouth to seal said flask, said sealing means having a first opening and a second opening, sample supplying means in the form of a syringe selectively operable to inject said sample into said flask, said sample supplying means being closed to prevent gas escape therethrough and being removably insertable into said first opening in said removable sealing means in sealed relationship, said flask having an air space therein which tends to vary in volume depending on the amount of agent deposited in said flask or the extent of insertion of said sealing means in said mouth or both, tube means having one end connected to said second opening in said sealing means and having its other end exposed to atmosphere, said tube means comprising a first rigid tubular member removably insertable in said second opening in said sealing means, a flexible intermediate portion detachably connected at one end to said first rigid tubular member and a second rigid vertically movable upright tubular member detachably connected to the other end of said flexible intermediate portion, said second tubular member having a transparent portion, an indicator liquid in said tube means providing a meniscus in said second tubular member which is visible through said transparent portion, scale means mounted in fixed position on said upright member of said supporting means and including a fixed starting point and fixed graduated indicia directly indicative of percentages by weight of acid possibly contained in a sample, and attachment means on said upright member of said supporting means for releasably securing said second tubular member to said upright member of said supporting means in desired fixed adjustment positions, said second tubular member being relatively movable vertically with respect to said scale means to initially effect alignment of said meniscus with said starting point after said flask is sealed and prior to exposure of said sample to said agent for adjustment purposes to compensate for variations in volume in the air space in said flask, said indicator liquid being subsequently displaceable in response to generation of gas in said sealed flask so that said meniscus moves into alignment with the said indicia on said scale means to provide a direct indication of the percentage by weight of acid present in said sample.

* * * * *